(12) United States Patent
Dou et al.

(10) Patent No.: US 12,109,901 B2
(45) Date of Patent: Oct. 8, 2024

(54) CHARGING SOCKET

(71) Applicants: TYCO ELECTRONICS TECHNOLOGY (SIP) LTD., Jiangsun Province (CN); TYCO ELECTRONICS (SHANGHAI) CO. LTD, Shanghai (CN)

(72) Inventors: Renyi (Ronny) Dou, Suzhou (CN); Fangyue (Jason) Zhu, Shanghai (CN); Kaixuan (Evan) Jiang, Shanghai (CN)

(73) Assignees: TYCO ELECTRONICS TECHNOLOGY (SIP) LTD., Jiangsun Province (CN); TYCO ELECTRONICS (SHANGHAI) CO. LTD, Shanghai (CN)

( * ) Notice: Subject to any disclaimer, the term of this patent is extended or adjusted under 35 U.S.C. 154(b) by 479 days.

(21) Appl. No.: 17/575,909

(22) Filed: Jan. 14, 2022

(65) Prior Publication Data
US 2022/0227245 A1 Jul. 21, 2022

(30) Foreign Application Priority Data
Jan. 20, 2021 (CN) .......................... 202120156630.3

(51) Int. Cl.
*B60L 53/16* (2019.01)
*H01R 13/426* (2006.01)
*H01R 31/06* (2006.01)

(52) U.S. Cl.
CPC ............ *B60L 53/16* (2019.02); *H01R 13/426* (2013.01); *H01R 31/06* (2013.01); *H01R 2201/26* (2013.01)

(58) Field of Classification Search
CPC ....... B60L 53/16; H01R 13/426; H01R 31/06; H01R 2201/26; H01R 13/506; H01R 13/4367; H01R 13/42; H01R 13/514; H01R 13/629; H01R 13/639
See application file for complete search history.

(56) References Cited

U.S. PATENT DOCUMENTS 10,988,041 B2 * 4/2021 de Chazal ............ H01R 13/005
11,919,409 B2 * 3/2024 Peterson ................. B60L 53/10

* cited by examiner

Primary Examiner — Briggitte R. Hammond
(74) Attorney, Agent, or Firm — Potomac Law Group, PLLC (57) ABSTRACT

The present application provides a charging socket including a socket body, the socket body is provided with a charging end configured to connect to a charging plug, a conversion end configured to connect to a battery pack, and a terminal accommodating cavity communicated with and between the charging end and the conversion end; the conversion end is provided with a mating installation groove configured to mount an adapter plug and configured to pluggably connect with the adapter plug. In the charging socket provided in the present application, only the adapter plug is required to be pulled out from the mating installation groove on the socket body when the charging terminal mounted in the terminal accommodating cavity needs to be repaired or replaced, thereby removal of the connection between the charging terminal and the battery pack is completed, which effectively reduces the difficulty of disassembly and assembly. Therefore, this process is simple, improves the working efficiency, and reduces the maintenance cost.

19 Claims, 6 Drawing Sheets

CHARGING SOCKET

TECHNICAL FIELD

The present application involves in the field of charger technologies, and more particularly relates to a charging socket.

BACKGROUND OF INVENTION

With increasing pressure on worldwide energy and environment, the concept of energy and environmental protection has been penetrated into various fields. For the automotive industry, compared with traditional fuel engine vehicles and gas engine vehicles, electric vehicles using a power battery as a power source have gradually entered a wide range of practical stages due to their characteristics of cleanness and environmental protection. With gradual increase in the number of the electric vehicles, it is necessary to charge the battery frequently during the use of the electric vehicle. The electric vehicle is equipped with a charging socket connected to an internal battery, such that it is convenient for a user to plug an external power plug into the charging socket for charging the battery inside the vehicle. In the prior art, a power cord of the charging socket is directly riveted on a connecting terminal, which causes that the power cord and the connecting terminal are not able to be disassembled, and that the disassembly and assembly of the charging socket are difficult, and the maintenance cost is high when the charging socket is used repeatedly or accidentally damaged and then the connecting terminal of the charging socket needs to be repaired and replaced.

SUMMARY OF INVENTION

A purpose of the present application is to provide a charging socket, so as to solve the technical problems in the art that the disassembly and assembly of the charging socket are difficult, and the maintenance cost is high because the connecting terminal and the power cord are not able to be disassembled when the connecting terminal in the charging socket needs to be repaired and replaced.

In order to achieve the above purpose, a technical solution adopted by the present application is a charging socket including a socket body, where the socket body is provided with a charging end configured to connect to a charging plug, a conversion end configured to connect to a battery pack, and a terminal accommodating cavity communicated with and between the charging end and the conversion end, where the conversion end is provided with a mating installation groove configured to mount an adapter plug and configured to pluggably connect with the adapter plug.

In an embodiment, the socket body is provided with a position limiting component located in the mating installation groove and configured to restrict displacement of the adapter plug in the mating installation groove.

In an embodiment, the position limiting component includes a first position limiting structure protrudedly arranged at the socket body and disposed on a bottom surface of the mating installation groove, and a peripheral side wall of the adaptor plug extends toward a direction of the socket body and encloses a second position limiting structure protrudedly arranged at a bottom surface of the adapter plug to form a position limiting area configured to be fitted into by the first position limiting structure.

In an embodiment, a sealing ring is provided in the position limiting area, and the sealing ring is arranged between the first position limiting structure and the second position limiting structure.

In an embodiment, the charging socket further includes a charging terminal, the charging terminal is arranged in the terminal accommodating cavity of the socket body, one end of the charging terminal is connected with a mating terminal of the charging plug, and the other end of the charging terminal is connected with the adapter plug.

In an embodiment, the charging socket further includes the adapter plug detachably connected to the socket body, and the adapter plug is pluggably connected with the socket body.

In an embodiment, the adapter plug includes an adapter housing and a conversion terminal arranged on the adapter housing, one end of the conversion terminal is connected to the charging terminal, and the other end of the conversion terminal is electrically connected to the battery pack.

In an embodiment, a bottom surface of the adapter housing is provided with a first piercing hole configured to be passed through by the charging terminal and pluggably connected by the adapter terminal in an axial direction, and a shape of the first piercing hole is adapted to a shape of a cross section of the conversion terminal.

In an embodiment, a top surface of the adapter housing is provided with a second piercing hole configured to be passed through by the conversion terminal and connected with the battery pack.

In an embodiment, the charging socket further includes an engagement assembly configured to detachably connect the socket body with the adapter plug, and the engagement assembly includes an engagement frame arranged on a side wall of the adapter housing and a locking member inserted on the engagement frame.

In an embodiment, the socket body is provided with a reserved groove configured to be fitted into by the engagement frame, the reserved groove is arranged in communication with the mating installation groove, and the locking member is pluggably arranged in the reserved groove and is mutually engaged with a first engagement protrusion protrudingly provided on a surface of the adapter housing.

In an embodiment, a positioning protrusion is provided on the engagement frame, and the locking member includes a holding seat configured to clamp the positioning protrusion; the holding seat includes a first holding arm and a second holding arm arranged spaced apart from the first holding arm, and a holding area configured to be fitted into by the positioning protrusion is formed between the first holding arm and the second holding arm.

In an embodiment, the locking member further includes a first hook fixedly connected to the first holding arm, and the first hook and the first engagement protrusion are engaged with each other.

In an embodiment, the engagement frame is provided with a plurality of position limiting guide rails configured to restrict a movement direction of the locking member, the plurality of position limiting guide rails are arranged parallel to each other, and a surface of the first holding arm is recessed and formed with a position limiting groove adapted to the position limiting guide rails.

In an embodiment, the engagement frame is provided with a second engagement protrusion located between adjacent two of the position limiting guide rails and configured to restrict displacement of the locking member, and the surface of the first holding arm is protrudedly formed with a second hook in snap connection with the second engagement protrusion.

Beneficial effects of the charging socket provided by the present application lie in that: compared with the prior art, the charging socket in the present application includes a socket body, the socket body is provided with a charging end configured to externally connect to a charging plug, a conversion end configured to connect to a battery pack, and a terminal accommodating cavity communicated with and between the charging end and the conversion end, and the conversion end of the socket body is provided with a mating installation groove configured to mount an adapter plug and configured to be in pluggable connection with the adapter plug; through the addition of the adapter plug configured to connect the battery pack on the charging socket, the pluggable connection of the socket body with the adapter plug via the mating installation groove, and by using the external connection of the charging end of the charging socket with the charging plug, and the connection of the adapter plug (that is pluggably connected to the socket body) with the battery pack, only the adapter plug is required to be pulled out from the mating installation groove disposed on the socket body when the charging terminal mounted in the terminal accommodating cavity needs to be repaired or replaced, thereby the removal of the connection between the charging terminal and the battery pack is completed, which effectively reduces the difficulty of disassembly and assembly. Therefore, this process is simple, improves the working efficiency, and reduces the maintenance cost.

DESCRIPTION OF THE DRAWINGS

In order to illustrate the technical solutions in the embodiments of the present application more clearly, the drawings needed to be used in the description of the embodiments or the prior art will be briefly introduced below. Obviously, the drawings in the following description are only some embodiments of the present application, and other drawings may also be obtained by those of ordinary skill in the art based on these drawings without creative labor.

Among them, reference signs in the drawings are as follows:

1—charging socket; 2—socket body; 21—charging end; 22—conversion end; 221—mating installation groove; 222—reserved groove; 223—first position limiting structure; 23—terminal accommodating cavity; 24—charging terminal; 3—adapter plug; 31—adapter housing; 311—second position limiting structure; 312—position limiting area; 3121—sealing ring; 313—first piercing hole; 314—second piercing hole; 315—first engagement protrusion; 32—conversion terminal; 4—engagement assembly; 41—engagement frame; 411—positioning protrusion; 412—position limiting guide rail; 413—second engagement protrusion; 42—locking member; 421—holding seat; 4211—first holding arm; 42111—position limiting groove; 42112—second hook; 4212—second holding arm; 422—first hook.

DETAILED EMBODIMENTS

In order to make the technical problems to be solved, technical solutions and beneficial effects of the present application more comprehensible, the present application is described in detail below with reference to the accompanying drawings and embodiments. It should be understood that the specific embodiments described herein are only used to explain the present application and are not used to limit the present application.

It should be noted that, when an element is referred to as being "fixed to" or "arranged on" another element, this element may be directly on the another element or indirectly on the another element; when an element is referred to as being "connected to" another element, this element may be directly connected to the another element or indirectly connected to the another element.

It should be understood that, orientations or positional relationships indicated by terms such as "length", "width", "upper", "lower", "front", "rear", "left", "right", "vertical", "horizontal", "top", "bottom", "inner", "outer", etc. are based on orientations or positional relationships as shown in the drawings, which are only aimed to facilitate description of the present application and simplification of the description, rather than to indicate or imply that an indicated device or element must have a specific orientation or be constructed and operated in a specific orientation. Therefore, the orientations or positional relationships cannot be understood as a limitation of the present application.

Additionally, the terms "first" and "second" are only used for a descriptive purpose and cannot be understood as an indication or implication of relative importance or an implicit indication of the number of an indicated technical feature. Thus, a feature defined with "first" and "second" may explicitly or implicitly include one or more of the features. In the description of the present application, "a plurality of" means two or more than two, unless otherwise explicitly and specifically defined.

Figure 1:
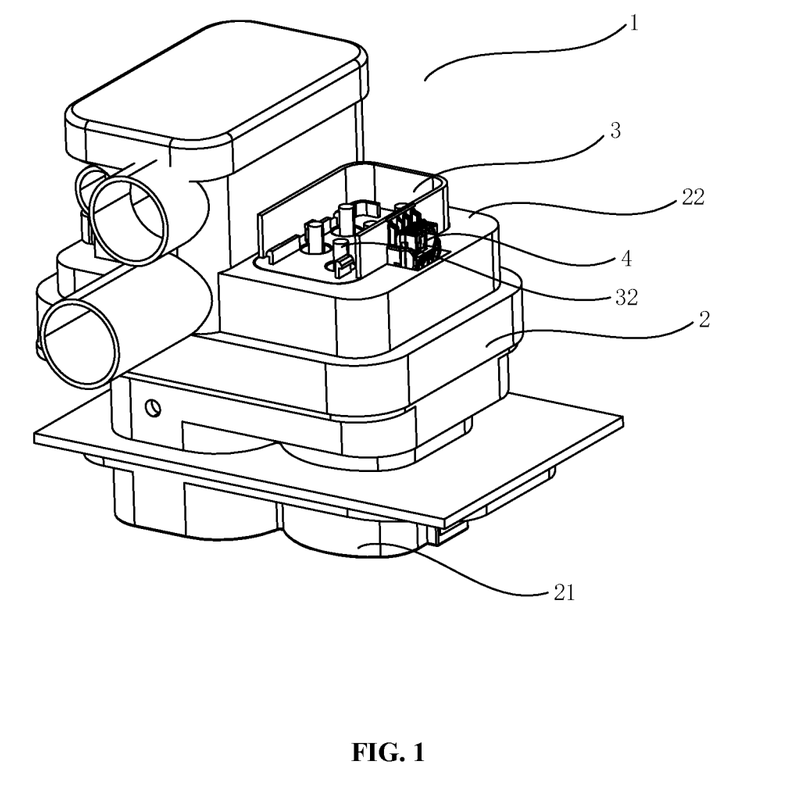
FIG. 1 is a stereoscopic structure diagram of the charging socket provided by an embodiment of the present application.
Figure 2:
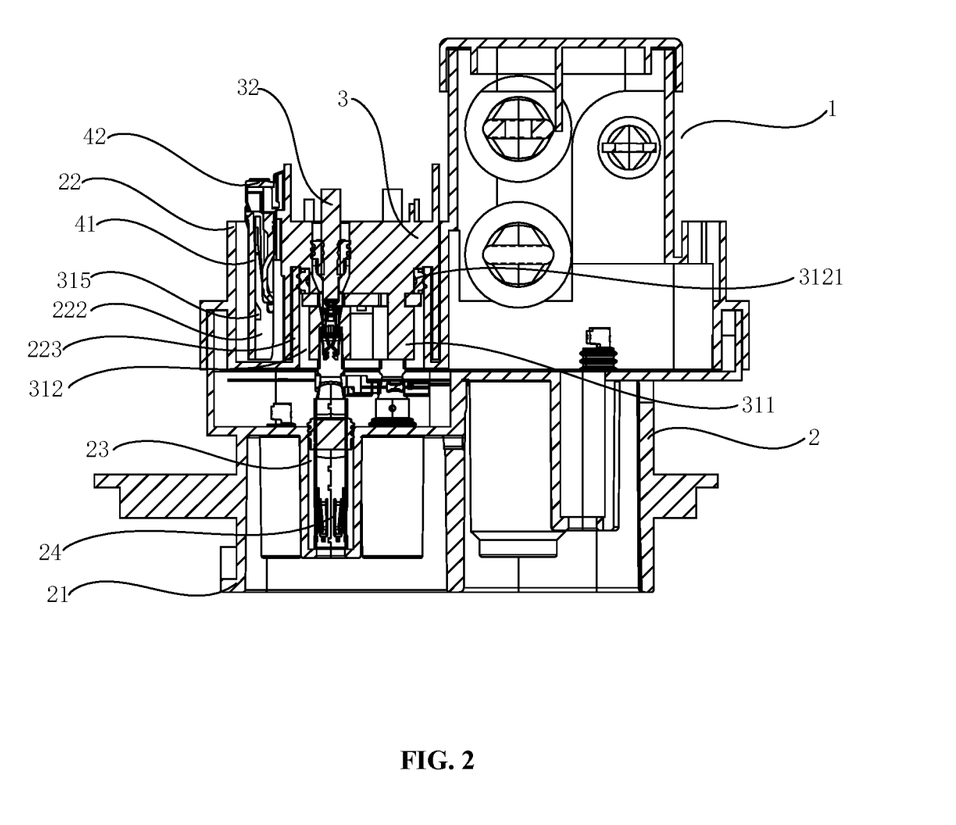
FIG. 2 is a cross-sectional structure diagram of the charging socket provided by an embodiment of the present application.
Figure 3:
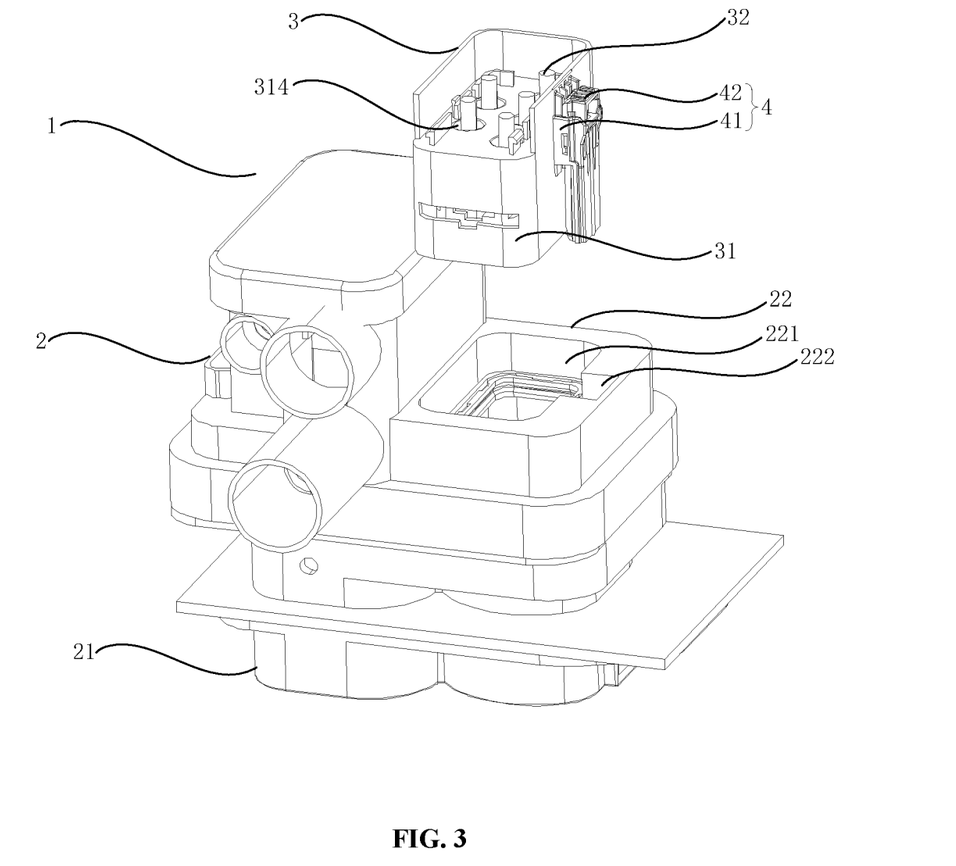
FIG. 3 is an exploded structure diagram of the charging socket provided by an embodiment of the present application.

Please refer to FIGS. 1 to 3 together, the charging socket 1 provided in this embodiment includes a socket body 2. The socket body 2 is provided with a charging end 21 configured to externally connect to a charging plug, a conversion end 22 configured to connect to a battery pack, and a terminal accommodating cavity 23 communicated with and between the charging end 21 and the conversion end 22. The conversion end 22 of the socket body 2 is provided with a mating installation groove 221 configured to mount an adapter plug 3 and configured to be in pluggable connection with the adapter plug 3. Through the addition of the adapter plug 3 configured to connect the battery pack on the charging socket 1, the pluggable connection of the socket body 2 with the adapter plug 3 via the mating installation groove 221, and by using the external connection of the charging end 21 of the charging socket 1 with the charging plug, and the connection of the adapter plug 3 (that is pluggably connected to the socket body 2) with the battery pack, only the adapter plug 3 is required to be pulled out from the mating installation groove 221 disposed on the socket body 2 when a charging terminal 24 mounted in the terminal accommodating cavity 23 needs to be repaired or replaced, thereby the removal of the connection between the charging terminal 24 and the battery pack is completed, which effectively reduces the difficulty of disassembly and assembly. Therefore, the process is simple, improves the working efficiency, and reduces the maintenance cost.

Please refer to FIGS. 1 to 2 together, as a specific implementation of the charging socket 1 provided in this embodiment, the charging socket 1 further includes a charging terminal 24 arranged in the terminal accommodating cavity 23 of the socket body 2. One end of the charging terminal 24 is connected to a mating terminal of the charging plug, and the other end of the charging terminal 24 is connected to the adapter plug 3. Through the pluggable connection of the charging terminal 24 to the mating terminal of the charging plug, the electrical energy is delivered to the battery pack electrically connected with the charging socket 1, thereby realizing electric energy transmission. The charging socket 1 further includes an adapter plug 3 that is detachably connected to the socket body 2, and the adapter plug 3 is pluggably connected with the socket body 2. When it is necessary to repair or replace the charging terminal 24 mounted in the terminal accommodating cavity 23, only the adapter plug 3 needs to be to pulled out from the mating installation groove 221 disposed on the socket body 2, thereby the removal of the connection between the charging terminal 24 and the battery pack is completed, which effectively reduces the difficulty of disassembly and assembly. Therefore, the process is simple, improves the work efficiency, and reduces the maintenance cost.

Figure 4:
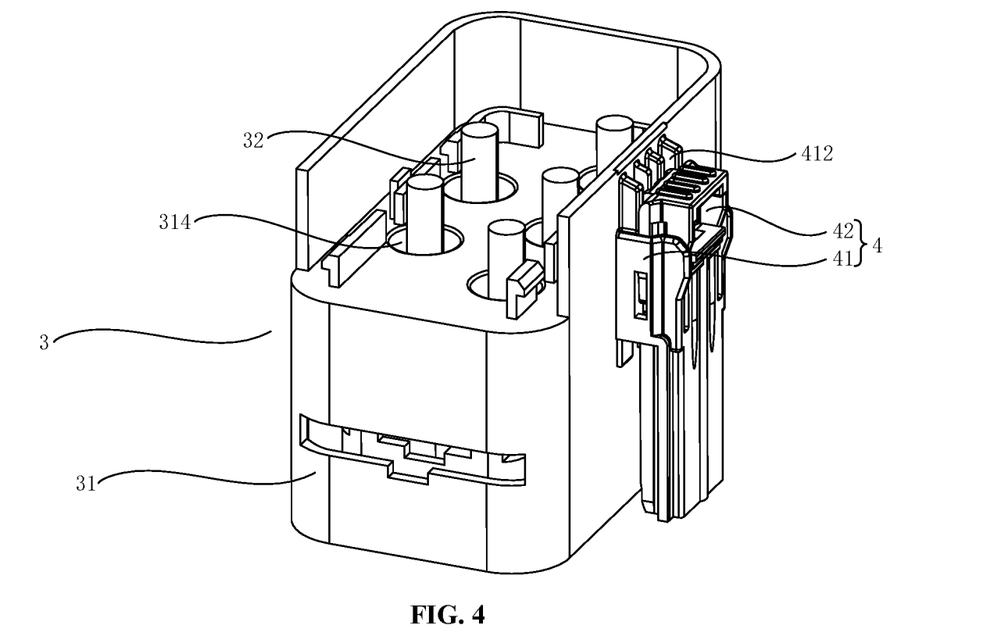
FIG. 4 is a stereoscopic structure diagram of an adapter plug of the charging socket provided by an embodiment of the present application.

Please refer to FIGS. 2 to 4 together, in this embodiment, the adapter plug 3 of the charging socket 1 includes an adapter housing 31 that is pluggably connected to the socket body 2 and a conversion terminal 32 that is provided on the adapter housing 31. One end of the conversion terminal 32 is pluggably connected with the charging terminal 24, and the other end of the conversion terminal 3 is electrically connected to the battery pack, and the power transmitted by the charging plug is transmitted to the battery pack through the conversion terminal 32 to realize power transmission.

Please refer to FIGS. 4 to 7 together, in this embodiment, a bottom surface of the adapter housing 31 is provided with a first piercing hole 313 through which the charging terminal 24 passes and is pluggably connected with the conversion terminal 32 in an axial direction. One end of the charging terminal 24 passes through the first piercing hole 313 and is pluggably connected with the conversion terminal 32 in the axial direction. Optionally, a shape of the first piercing hole 313 is adapted to a shape of a cross section of the conversion terminal 32, which achieves a function of position limit during the process of the pluggable connection of the charging terminal 24 with the conversion terminal 32, thereby facilitating assembling. Optionally, a top surface of the adapter housing 31 is provided with a second piercing hole 314 through which the conversion terminal 32 passes and is connected to the battery pack, and the end of the conversion terminal 32 passes through the second piercing hole 314 and is electrically connected to the battery pack.

Figure 7:
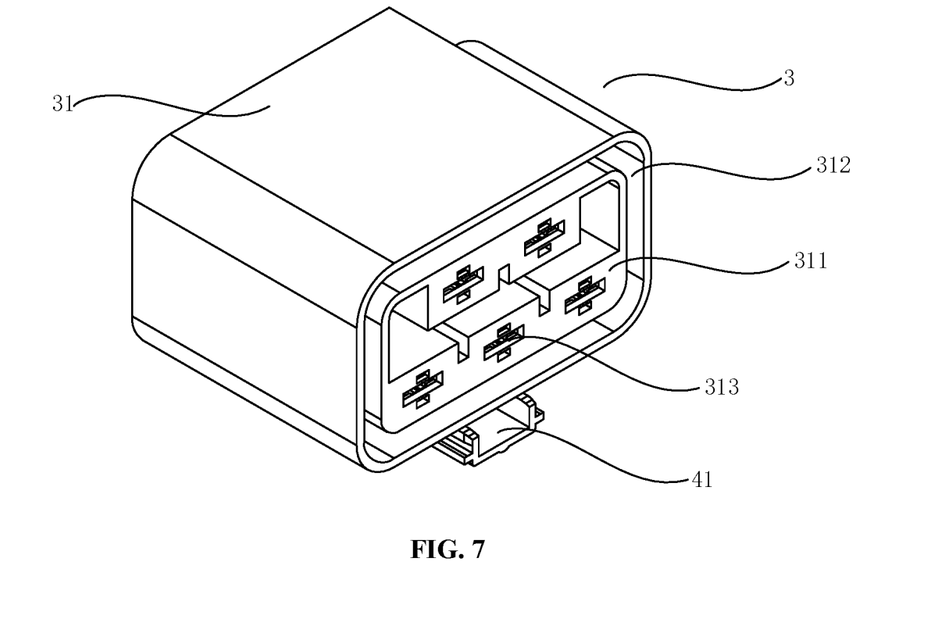
FIG. 7 is a second stereoscopic structure diagram of the adapter housing of the charging socket provided by an embodiment of the present application.
Figure 8:
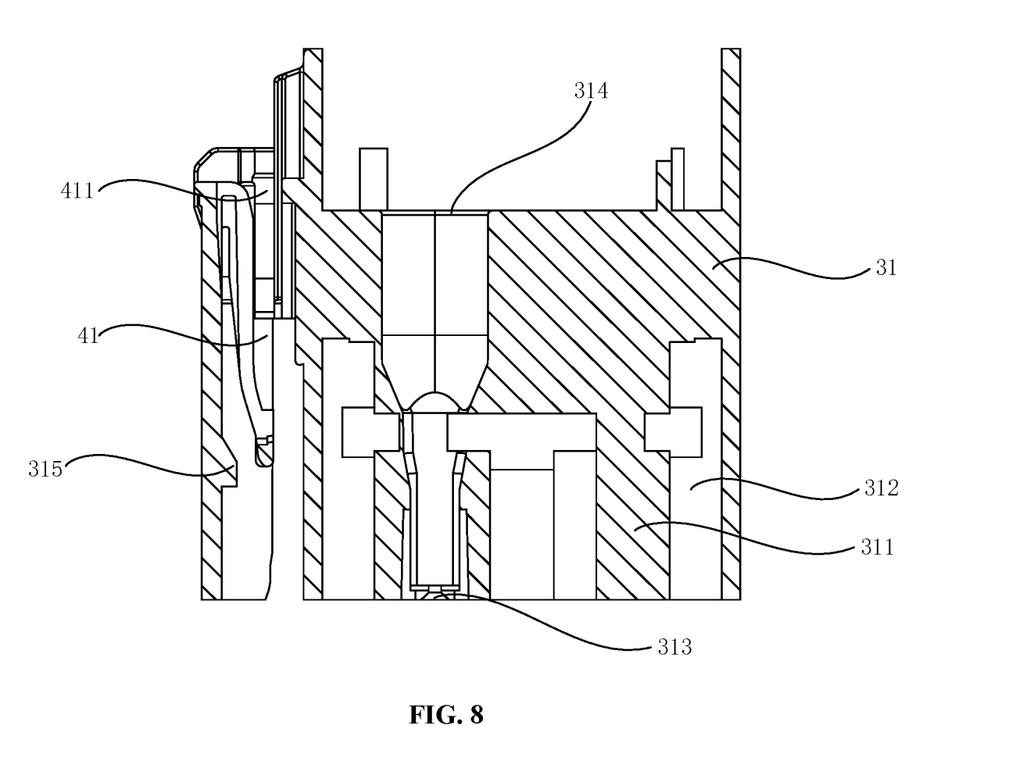
FIG. 8 is a cross-sectional structure diagram of the adapter housing of the adapter plug provided by an embodiment of the present application.

Please refer to FIGS. 2, 7 and 8 together, in this embodiment, the socket body 2 of the charging socket 1 is provided with a position limiting component located in the mating installation groove 221 and configured to restrict displacement of the adapter plug 3 in the mating installation groove, such that the connection between the socket body 2 and the adapter plug 3 is more stable, and damage to the connection between the charging terminal 24 and the conversion terminal 32 as well as influence to the power transmission, due to the displacement of the adapter plug 3 relative to the socket body 2 in the mating installation groove 221, are avoided, thereby effectively improving the product reliability of the charging socket 1. The specific structure of the position limiting structure is not limited herein. Optionally, the position limiting component includes a first position limiting structure 223 protrudedly arranged at the socket body 2 and disposed on a bottom surface of the mating installation groove 221; a peripheral side wall of the adaptor plug 3 extends toward a direction of the socket body 2, and encloses a second position limiting structure 311 protrudedly arranged at a bottom surface of the adapter plug 3 to form a position limiting area 312 configured to be fitted into by the first position limiting structure 223; the first position limiting structure 223 is placed into the position limiting area 312 of the adapter plug 3, so that the adapter plug 3 is accurately engaged to a preset position of the socket body 2, thereby facilitating assembling and improving the product reliability of the charging socket 1. Optionally, a sealing ring 3121 is provided in the position limiting area 312, and the sealing ring 3121 is provided between the first position limiting structure 223 and the second position limiting structure 311, on the one hand, this effectively improves the protective performance of the charging socket 1, through which water or dust etc. is prevented from entering the adapter housing 31 or flowing into the terminal accommodating cavity 23 of the socket body 2 via the first piercing hole 313, and through which damage to the internal structures of the charging socket 1 is prevented, thereby improving the product reliability; on the one hand, a friction force between the first position limiting structure 223 and the second position limiting structure 311 can be increased, so that the connection between the socket body 2 and the adapter plug 3 is more stable.

Please refer to FIG. 1, as a specific implementation of the charging socket 1 provided in this embodiment, the charging socket 1 further includes fasteners configured to detachably connect to the socket body 2 with the adapter plug 3, the socket body 2 is provided with a plurality of connecting holes located on a circumferential side wall of the mating installation groove 221 at interval, the adapter housing 31 is provided with fixing holes corresponding to the connecting holes, and the fasteners pass through the fixing holes and are threadedly connected to the connecting holes. The specific structure of the fasteners is not limited herein. Optionally, the fasteners are screws, and the fasteners pass through the fixing holes on the adapter housing 31 and are threadedly connected to the connecting holes on the socket body 2 to firmly mount the adapter plug 3 on the socket body 2.

Please refer to FIGS. 1, 2 and 4 together, as another specific implementation of the charging socket 1 provided in this embodiment, the charging socket 1 further includes an engagement assembly 4 configured to detachably connect the socket body 2 with the adapter plug 3. The specific structure of the engagement assembly 4 is not limited herein.

The engagement assembly 4 includes an engagement frame 41 arranged on a side wall of the adapter housing 31 and a locking member 42 inserted on the engagement frame 41. Through inserting the locking member 42 on the engagement frame 41, the adapter plug 3 is firmly mounted in the socket body 2. Optionally, the socket body 2 is provided with a reserved groove 222 into which the engagement frame 41 is disposed, the reserved groove 222 is arranged in communication with the mating installation groove 221, the locking member 42 is pluggably arranged in the reserved groove 222 and is mutually engaged with a first engagement protrusion 315 protrudedly arranged on a surface of the adapter housing 31, and the adapter plug 3 is firmly mounted in the mating installation groove 221 of the socket body 2 through the buckle connection between the locking member 42 and the first engagement protrusion 315.

Figure 5:
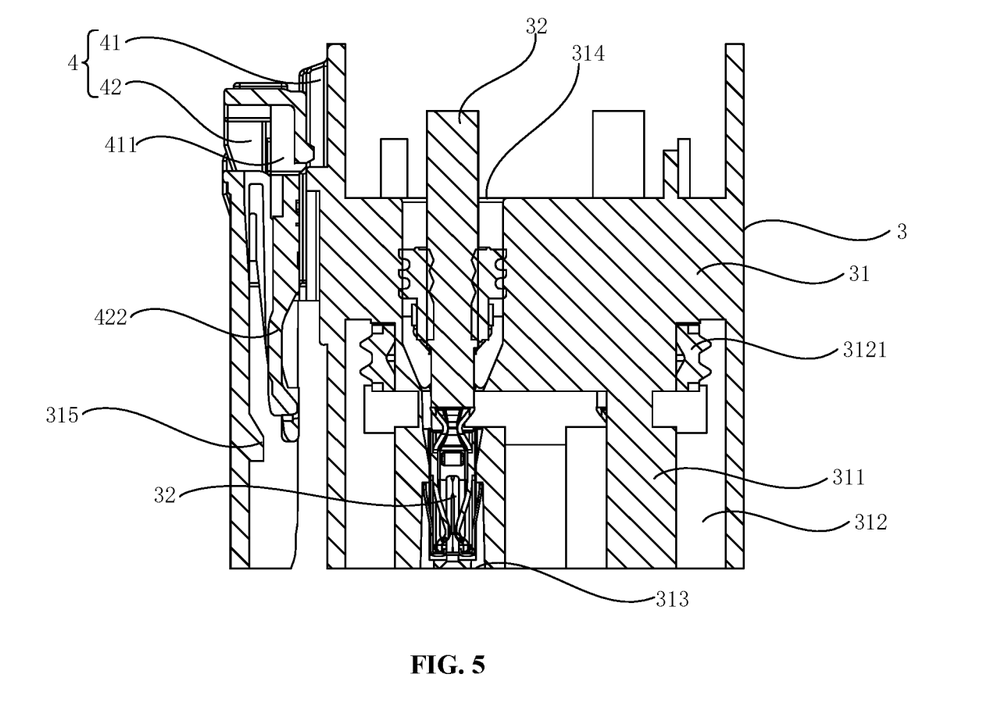
FIG. 5 is a cross-sectional structure diagram of the adapter plug of the charging socket provided by an embodiment of the present application.
Figure 9:
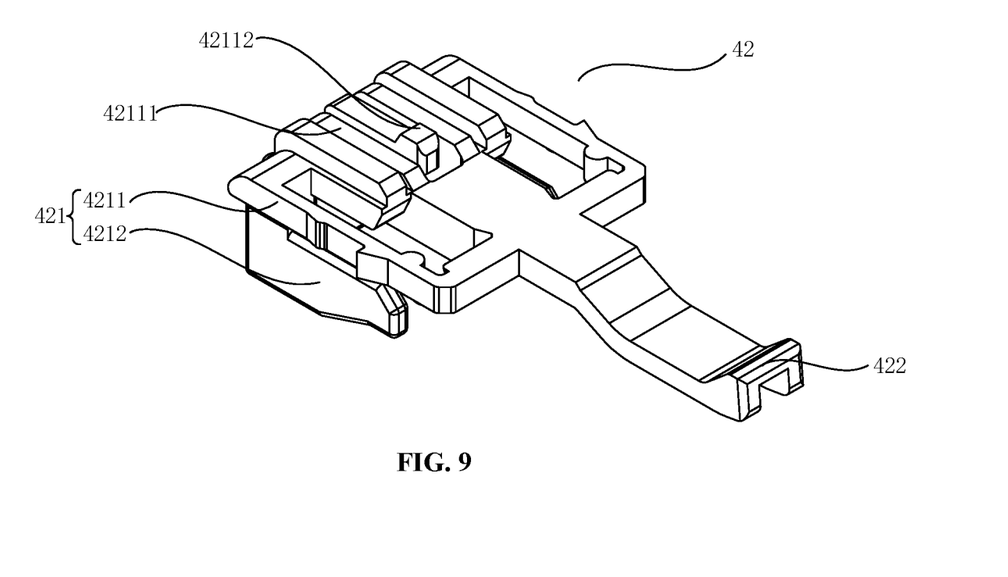
FIG. 9 is a stereoscopic structure diagram of a locking member of a clamping assembly provided by an embodiment of the present application.

Please refer to FIGS. 4, 5 and 9 together, in this embodiment, the engagement frame 41 of the adapter plug 3 is provided with a positioning protrusion 411, the locking member 42 includes a holding seat 421 configured to clamp the positioning protrusion 411, the holding seat 421 includes a first holding arm 4211 and a second holding arm 4212 spaced apart from the first holding arm 4211, a holding area where the positioning protrusion 411 is fitted is provided between the first holding arm 4211 and the second holding arm 4212, the positioning protrusion 411 is clamped in the holding area formed through fitting the positioning protrusion 411 into the holding seat 421, and the locking member 42 is firmly and accurately mounted at a preset position on the holding frame 41, such that the stability of the connection between the adapter plug 3 and the socket body 2 is improved. Optionally, the locking member 42 further includes a first hook 422 fixedly connected to the first holding arm 4211, the first hook 422 and the first engagement protrusion 315 are engaged with each other, and the adapter plug 3 is firmly mounted in the mating installation groove 221 of the socket body 2 through the engagement connection between the first hook 422 of the locking member 42 and the first engagement protrusion 315. Optionally, the locking member 42 further includes a pressing structure provided on the holding seat 421, and a surface of the pressing structure is provided with an anti-skid part, and the anti-skid part provided on the surface of the pressing structure increases the frictional force between the hand of the operator and the locking member 42, such that the operation is more labor-saving, which is beneficial to the assembly and disassembly of the adapter plug 3 of the charging socket 1. The specific structure of the anti-skid part is not limited herein. Optionally, the anti-skid part is an anti-skid protrusion protruded on the surface of the pressing structure, which has a simple structure and is easy to be produced.

Figure 6:
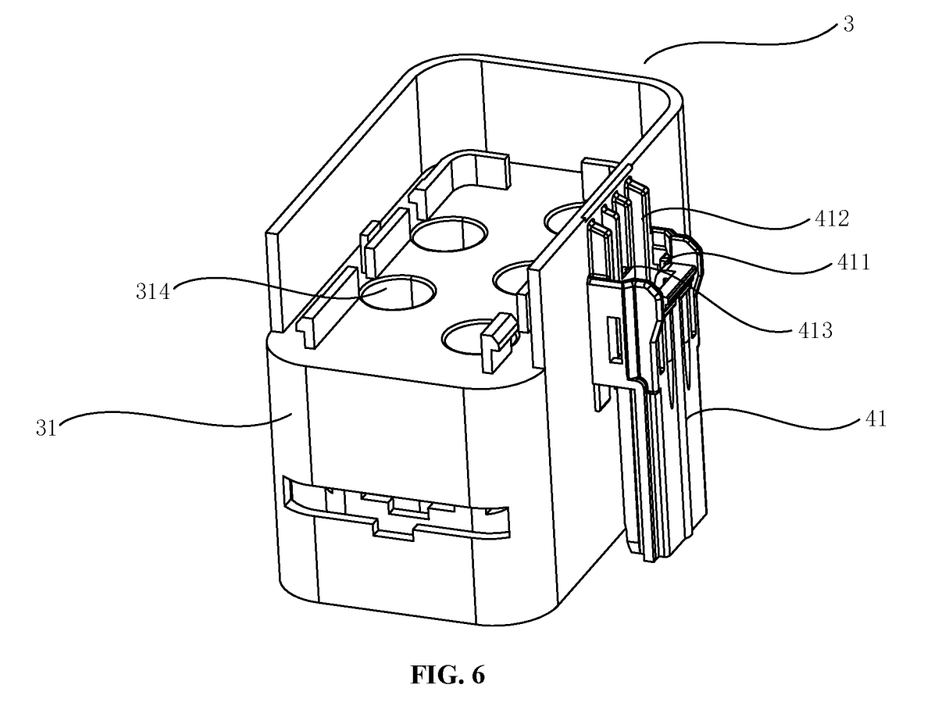
FIG. 6 is a first stereoscopic structure diagram of an adapter housing of the charging socket provided by an embodiment of the present application.

Please refer to FIGS. 4, 6 and 9 together, in this embodiment, the holding frame 41 of the adapter plug 3 is provided with a plurality of position limiting guide rails 412 configured to restrict a movement direction of the locking member 42, and the plurality of position limiting guide rails 412 are arranged parallel to each other. A surface of the first holding arm 4211 of the locking member 42 is recessed and formed with a position limiting groove 42111 adapted to the position limiting guide rails 412, and the position limiting function due to the mutual cooperation of the position limiting guide rails 412 and the position limiting groove 42111 makes the assembly of the locking member 42 more convenient and the installation direction more precise, so that the holding seat 421 of the locking member 42 can accurately clamp the positioning protrusion 411 to firmly and accurately mount the locking member 42 at the preset position on the holding frame 41, thereby improving the stability of the connection between the adapter plug 3 and the socket body 2. Optionally, the holding frame 41 is provided with a second engagement protrusion 413 located between adjacent two of the position limiting guide rails 412 and configured to restrict displacement of the locking member 42, the surface of the first holding arm 4211 is protrudedly formed with a second hook 42112 configured to in snap connection with the second engagement protrusion 413, and the snap connection between the second engagement protrusion 413 and the second hook 42112 further improves the stability of the connection between the locking member 42 and the engagement frame 41, such that the adapter plug 3 is firmly installed in the mating installation groove 221 of the socket body 2.

The above description has only described preferred embodiments of this embodiment and is not intended to limit this embodiment. Any modification, equivalent replacement and improvement made within the spirit and principle of this embodiment shall be included within the protection scope of this embodiment.

What is claimed is:

1. A charging socket, comprising a socket body, wherein the socket body is provided with a charging end configured to connect to a charging plug, a conversion end configured to connect to a battery pack, and a terminal accommodating cavity communicated with and between the charging end and the conversion end, wherein the conversion end is provided with a mating installation groove configured to mount an adapter plug and configured to pluggably connect with the adapter plug.

2. The charging socket of claim 1, wherein the socket body is provided with a position limiting component located in the mating installation groove and configured to restrict displacement of the adapter plug in the mating installation groove.

3. The charging socket of claim 2, wherein the position limiting component comprises a first position limiting structure protrudedly arranged at the socket body and disposed on a bottom surface of the mating installation groove, and a peripheral side wall of the adaptor plug extends toward a direction of the socket body and encloses a second position limiting structure protrudedly arranged at a bottom surface of the adapter plug to form a position limiting area configured to be fitted into by the first position limiting structure.

4. The charging socket of claim 3, wherein a sealing ring is provided in the position limiting area, and the sealing ring is arranged between the first position limiting structure and the second position limiting structure.

5. The charging socket of claim 1, wherein the charging socket further comprises a charging terminal, the charging terminal is arranged in the terminal accommodating cavity of the socket body, one end of the charging terminal is connected with a mating terminal of the charging plug, and the other end of the charging terminal is connected with the adapter plug.

6. The charging socket of claim 1, wherein the charging socket further comprises the adapter plug detachably connected to the socket body, and the adapter plug is pluggably connected with the socket body.

7. The charging socket of claim 6, wherein the adapter plug comprises an adapter housing and a conversion terminal arranged on the adapter housing, one end of the conversion terminal is connected to the charging terminal, and the other end of the conversion terminal is electrically connected to the battery pack.

8. The charging socket of claim 7, wherein a bottom surface of the adapter housing is provided with a first piercing hole configured to be passed through by the charging terminal and pluggably connected by the adapter terminal in an axial direction, and a shape of the first piercing hole is adapted to a shape of a cross section of the conversion terminal.

9. The charging socket of claim 7, wherein a top surface of the adapter housing is provided with a second piercing hole configured to be passed through by the conversion terminal and connected with the battery pack.

10. The charging socket of claim 7, wherein the charging socket further comprises an engagement assembly configured to detachably connect the socket body with the adapter plug, and the engagement assembly comprises an engagement frame arranged on a side wall of the adapter housing and a locking member inserted on the engagement frame.

11. The charging socket of claim 10, wherein the socket body is provided with a reserved groove configured to be fitted into by the engagement frame, the reserved groove is arranged in communication with the mating installation groove, and the locking member is pluggably arranged in the reserved groove and is mutually engaged with a first engagement protrusion protrudingly provided on a surface of the adapter housing.

12. The charging socket of claim 11, wherein a positioning protrusion is provided on the engagement frame, and the locking member comprises a holding seat configured to clamp the positioning protrusion; the holding seat comprises a first holding arm and a second holding arm arranged spaced apart from the first holding arm, and a holding area configured to be fitted into by the positioning protrusion is formed between the first holding arm and the second holding arm.

13. The charging socket of claim 12, wherein the locking member further comprises a first hook fixedly connected to the first holding arm, and the first hook and the first engagement protrusion are engaged with each other.

14. The charging socket of claim 12, wherein the engagement frame is provided with a plurality of position limiting guide rails configured to restrict a movement direction of the locking member, the plurality of position limiting guide rails are arranged parallel to each other, and a surface of the first holding arm is recessed and formed with a position limiting groove adapted to the position limiting guide rails.

15. The charging socket of claim 14, wherein the engagement frame is provided with a second engagement protrusion located between adjacent two of the position limiting guide rails and configured to restrict displacement of the locking member, and the surface of the first holding arm is protrudedly formed with a second hook in snap connection with the second engagement protrusion.

16. The charging socket of claim 2, wherein the charging socket further comprises the adapter plug detachably connected to the socket body, and the adapter plug is pluggably connected with the socket body.

17. The charging socket of claim 3, wherein the charging socket further comprises the adapter plug detachably connected to the socket body, and the adapter plug is pluggably connected with the socket body.

18. The charging socket of claim 4, wherein the charging socket further comprises the adapter plug detachably connected to the socket body, and the adapter plug is pluggably connected with the socket body.

19. The charging socket of claim 5, wherein the charging socket further comprises the adapter plug detachably connected to the socket body, and the adapter plug is pluggably connected with the socket body.

* * * * *